May 16, 1939.  E. H. LAND  2,158,130
LIGHT POLARIZER
Filed July 16, 1938
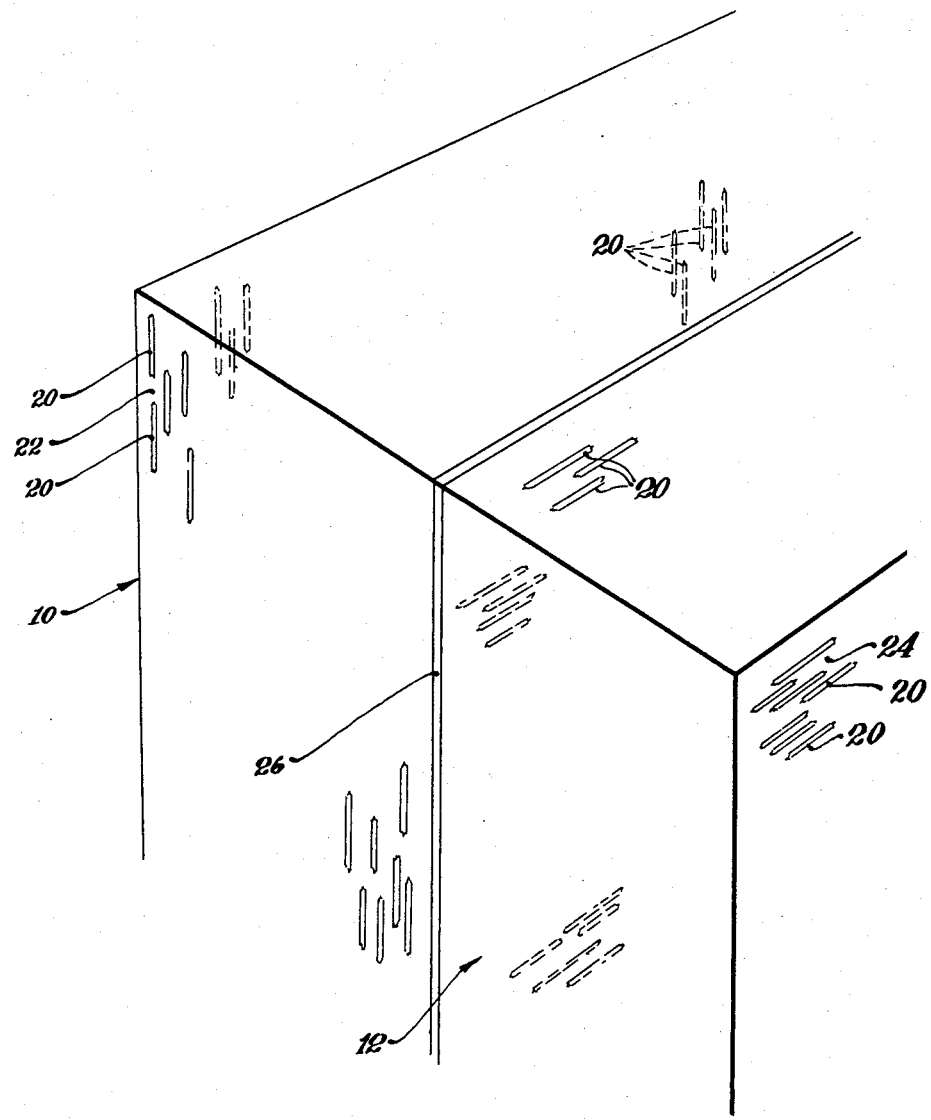
INVENTOR
Edwin H. Land
BY
Brown & Jones
ATTORNEYS Patented May 16, 1939

2,158,130

UNITED STATES PATENT OFFICE 2,158,130

LIGHT POLARIZER

Edwin H. Land, Boston, Mass., assignor, by mesne assignments, to Polaroid Corporation, Dover, Del., a corporation of Delaware Application July 16, 1938, Serial No. 219,541

8 Claims. (Cl. 88—65)

This invention relates to a new and improved light-polarizer, and more particularly to a polarizer adapted to resolve an incident beam of light into two differently polarized components, one of which is transmitted by the polarizer without diffusion, and the other of which is transmitted in the form of a highly diffused beam.

An object of the invention is to provide a light-polarizer of the character described comprising a plurality of overlying sheets of rod- or needle-shaped crystals suspended in suitable light-transmitting media, each sheet comprising an optically oriented suspension of birefringent crystals, the crystals in one sheet being oriented at right angles to the direction of orientation of the crystals of the adjacent sheet.

Another object of the invention is to provide a device of the character described wherein the suspending medium of one of said sheets has an index of refraction matching approximately the upper index of refraction of the suspended crystalline particles, and the index of refraction of the suspending medium of the other of said sheets matches the lower index of refraction of the suspended particles.

Other objects of the invention will in part be obvious and will in part appear hereinafter.

The invention accordingly comprises an article of manufacture possessing the features, properties, and the relation of elements which will be exemplified in the article hereinafter described, and the scope of the application of which will be indicated in the claims.

For a fuller understanding of the nature and objects of the invention reference should be had to the following detailed description taken in connection with the accompanying drawing, which represents diagrammatically and in greatly enlarged scale a perspective view of a device embodying one form of the invention.

This application is a continuation in part of my copending application Serial No. 72,501 for improvements in Light-polarizing material, filed April 3, 1936 (Patent No. 2,123,901), and my co-pending application Serial No. 83,040, for Light-polarizing material, filed June 2, 1936, (Patent No. 2,123,902).

In my said copending applications there is disclosed a light-polarizing material comprising a suspension of birefringent, needle-shaped or rod-shaped crystals in a light-transmitting suspending medium. The crystals are oriented within the medium so that the needle axes of the crystals are parallel and the crystals are so selected that the needle axis corresponds to a principal optical direction. The crystals described may be biaxial or uniaxial.

The light-transmitting medium in which the crystals are suspended is selected so that it has an index of refraction coinciding substantially with one of the indices of refraction of the suspended crystalline particles. The other index of refraction of the crystalline particles differs from that of the suspending medium.

The polarizer described in my said copending applications may be most readily formed by incorporating the crystals in the suspending medium when the suspending medium is softened, as for example by the addition of a solvent. The mixture of the crystals in the medium may then be subjected to a mechanical stress, such for example as extrusion or stretch or rubbing or smearing or flow. Where the crystals are rod-shaped or needle-shaped, such a stress results in an orientation of the crystals within the medium, the needle axes of the crystals tending to align in the direction of the application of the stress to the suspension.

Hence a preferred embodiment of the invention is one employing rod-shaped or needle-shaped crystals, as crystals of this form are easily oriented. A polarizing body comprising a suspension of rod-shaped or needle-shaped crystals in a suitable suspending medium which matches one only of the indices of the suspended birefringent crystals acts on an incident beam of non-polarized light to resolve it into two transmitted components, one of which is polarized and transmitted as a specular or substantially non-diffused beam, the other of which is transmitted as a polarized diffused beam. This latter component is polarized at right angles to the specular component and is diffused cylindrically, i. e., in planes substantially at right angles to the direction of orientation of the needle axes of the suspended crystals. Thus if the polarizing body is positioned so that the direction of orientation of the crystals is vertical, the diffused component will be spread or diffused horizontally.

In many of the commercial applications of the polarizer it is desirable that the diffusion of the non-specular component be as great as possible. For example, where the material is used in connection with an automobile headlight in the elimination or reduction of automobile headlight glare, the specular component may be employed to form the hot spot of the projected beam. A cooperating windshield visor of an approaching car may be adapted to block this specular component. If it is so adapted it will transmit the diffused component. In the reduction of glare it is desirable that the diffusion of the diffused component be as great as possible, so that the amount transmitted through the polarizing visor of an approaching car be reduced to a minimum.

This invention contemplates a modified form of the light-polarizer disclosed in my said copending applications. In the present form the diffused component, after the light has traversed the first element of the combination, is again diffused by transmission through the second element of the combination, the second diffusion being in a direction at right angles to the direction of the first diffusion. This is accomplished by providing a light-polarizer comprising a plurality of elements such as are disclosed in my said copending applications. These elements are shown in the drawing as 10 and 12. Each element comprises a set suspension of optically oriented birefringent needle-shaped crystals 20 in a light-transmitting medium. 22 indicates the medium of one of the elements, and 24 indicates the medium of the other element. The suspending media are so selected that one medium, for example the medium 22, has an index of refraction matching substantially the upper index of refraction of the oriented suspended crystals 20, while the other medium, 24, has an index of refraction matching the lower index of the oriented suspended crystals 20. The media may preferably be isotropic. If they are birefringent their second index of refraction should not match the other index of the suspended crystals, i. e., the media and the suspended crystals should have only one matching index.

As shown in the drawing, the two suspensions are assembled in such a way that the oriented crystals in one suspension are substantially at right angles to the oriented crystals in the other suspension. The two sheets may be separately mounted to intercept the beam, or they may be united, as for example by any suitable adhesive 26, to form a unitary structure.

In such a device the first sheet, for example the sheet 10, transmits one component of the incident beam, for example the component vibrating in the direction of orientation of the suspended crystals, without diffusion. That same component is transmitted by the second sheet 20 without diffusion, for the crystals of that sheet and its suspending medium are selected to have matching indices for light vibrating in a direction at right angles to the direction of orientation of the suspended crystals, and hence in the direction of vibration of light vibrating parallel to the direction of orientation of the crystals in the sheet 10.

The other component of the incident beam is diffused in its passage through sheet 10, the diffusion being in directions at right angles to the direction of orientation of the suspended crystals. This component is further diffused by passage through the sheet 20, for it is vibrating in a direction for which indices of refraction of the suspended crystals and suspending medium of the sheet 20 differ. The diffusion resulting from passage through the sheet 20 is, however, at right angles to the direction of orientation of the suspended crystals within that sheet, and hence at right angles to the direction of diffusion imparted to the component by its passage through the sheet 10. This component of the transmitted beam will therefore be diffused in two directions at right angles to each other, and the combined diffusions may be such as to so reduce the intensity of the component on the windshield of an approaching car that glare is completely eliminated, even though the windshield does not block this component.

A preferred material for use in the manufacture of polarizers of the present invention is barium carbonate. It may be readily produced in needle-shaped crystals suitable for manufacture of the desired suspensions. Barium carbonate has an upper index of refraction of 1.676–1.677, and a lower index of refraction of 1.529. It may be considered as substantially uniaxial. A suitable suspending medium for matching the lower index may comprise a mixture of ethyl cellulose and benzyl cellulose, or a mixture of ethyl cellulose and Aroclor.

It will be apparent that other plastics may be employed and other mixtures of plastics or gums or resins, as more fully pointed out in my said copending applications. A suitable suspending medium for matching the upper index of barium carbonate may comprise a phenol aldehyde resin, for example Bakelite XR820, which has an index of 1.676. Other materials available are Piperine and chlorinated diphenyls, such as Aroclor 4465. Again it will be understood that other materials may be used, and that suitable suspending media may be produced in the manner outlined in my said copending applications.

Another crystalline material useful in the manufacture of the present invention is urea, having an upper index of approximately 1.606, and a lower index of 1.484. The suspending medium suitable for matching the upper index may be obtained from a mixture of benzyl cellulose and Aroclor, and a suitable mixture for matching the lower index may comprise cellulose acetate propionate and dimethyl phthalate.

It is to be understood that the crystals suspended in one sheet of the combination need not be of the same material as the crystals suspended in the other sheet. It is necessary only that the index of refraction of the suspending medium of one sheet match substantially the index of the suspended crystals for light vibrating parallel to the oriented needle axes of the crystals and that the refractive index of the suspending medium of the other sheet match the index of the suspended crystals for light vibrating perpendicular to the needle axes. The matching indices may both be the upper or the lower indices. The directions of orientation of the crystals in the two sheets should be perpendicular.

If the cementing material 26 is a half-wave plate or if such a device be positioned between the two sheets, both sheets may be identical in every respect, except that the directions or orientation of the needle axes in the sheets should be perpendicular and the half-wave plate should be positioned with its axis at an angle of 45° to the directions of vibration of the components traversing the first sheet.

It is to be understood that the mixtures and crystals heretofore described are to be considered solely as examples of many crystals and suspending media adapted for use in the manufacture of the present invention. A great number of other crystals and suspending media are to be found listed in my said co-pending application.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A light-polarizer adapted to resolve an incident beam of non-polarized light into two differently polarized components, one a specular component, the other a highly diffused component, comprising a plurality of sheet-like suspensions of needle-shaped, oriented, birefringent particles in light-transmitting media, the particles in one medium being oriented in a direction substantially at right angles to the direction of orientation of the particles in the other medium, one medium having an index of refraction substantially matching the upper index of refraction of said particles, the other medium having an index of refraction substantially matching the lower index of refraction of said particles.

2. In combination, a suspension of oriented, needle-shaped, birefringent particles, having a principal optical direction coinciding with the needle axes, in a light-transmitting medium having an index of refraction coinciding with the index of refraction of said particles for light vibrating in the direction of orientation of the needle axes of said particles, and a second suspension of oriented, needle-shaped, birefringent particles in a light-transmitting medium having an index of refraction substantially matching the index of refraction of said particles for light vibrating in a direction at right angles to the direction of orientation of the needle axes of said particles, and means to position said suspensions to intercept a beam of light with the needle axes of the particles in one suspension at substantially right angles to the needle axes of the particles in the other suspension.

3. In combination, a plurality of suspensions of needle-shaped, oriented, birefringent particles in light-transmitting media, one of said suspensions comprising a medium having an index of refraction substantially coinciding with the index of refraction of the particles suspended therein for light vibrating in a direction parallel to the needle axes of said particles, and having an index of refraction differing from the index of refraction of said particles for light vibrating in a direction at right angles to the needle axes of said particles, the other suspension comprising a medium having an index of refraction coinciding substantially with the index of refraction of the oriented, needle-shaped particles suspended therein for light vibrating in a direction at right angles to the oriented needle axes of said particles and having an index of refraction differing substantially from the index of refraction of the particles for light vibrating in a direction parallel to the oriented needle axes of the particles, and means to superimpose said suspensions so that the direction of orientation of the needle axes of the particles in one suspension is substantially at right angles to the direction of orientation of the needle axes of the particles in the other suspension.

4. In combination, a suspension of oriented, needle-shaped particles of barium carbonate in a light-transmitting suspending medium having an index of refraction substantially matching the upper index of barium carbonate, and a suspension of oriented needle-shaped particles of barium carbonate in a light-transmitting medium having an index of refraction matching substantially the lower index of refraction of barium carbonate, said suspensions being superimposed with the direction of orientation of the needle axes in one suspension at right angles to the direction of orientation of the needle axes in the other suspension.

5. In combination, a suspension of oriented, needle-shaped particles of urea in a light-transmitting suspending medium having an index of refraction substantially matching the upper index of urea, and a suspension of oriented needle-shaped particles of urea in a light-transmitting medium having an index of refraction matching substantially the lower index of refraction of urea, said suspensions being superimposed with the direction of orientation of the needle axes in one suspension at right angles to the direction of orientation of the needle axes in the other suspension.

6. In combination, a suspension of oriented, needle-shaped crystals in a light-transmitting medium, the index of refraction of the medium coinciding substantially with the index of refraction of the crystals for light vibrating parallel to the oriented needle axes of the crystals, the index of refraction of the medium differing substantially from the index of refraction of the crystals for light vibrating in a direction at right angles to the needle axes of the crystals, and a second suspension of needle-shaped, oriented crystals in a light-transmitting medium overlying said first suspension and positioned to intercept light transmitted thereby, the index of refraction of the suspending medium of said second suspension coinciding substantially with the index of refraction of the oriented, needle-shaped crystals therein for light vibrating in a direction perpendicular to the oriented needle axes of the crystals, the index of refraction of said medium differing substantially from the index of refraction of said crystals for light vibrating in a direction parallel to the oriented needle axes of said crystals, said suspensions being so positioned with respect to each other that the directions of orientation of the needle axes of the crystals therein are substantially perpendicular.

7. A light-polarizer comprising a plurality of suspensions of oriented, needle-shaped particles in light-transmitting media, said suspensions overlying and being positioned to intercept a beam of light, the direction of orientation of the needle axes of the particles in one suspension being at right angles to the direction of orientation of the needle axes of the particles in the other suspension, each suspending medium having an index of refraction matching substantially an index of refraction of the particles suspended therein, the matching indices of the particles and suspending medium of one suspension being for light vibrating in a direction substantially at right angles to the direction of vibration of light for which the other suspending medium and the particles suspended therein have matching indices, and means positioned between said suspensions for rotating the direction of vibration of light transmitted through either suspension through an angle of substantially 90°.

8. Means interposed in the path of a beam of non-polarized light for resolving said beam into two components, a specular component and a highly diffused component, said components being differently polarized, said means comprising a suspension of optically oriented, needle-shaped crystals in a light-transmitting medium, the indices of refraction of said medium and said crystals being such that said suspension transmits one component of the incident beam as a specular component and the other component as a diffused component, and a second suspension of optically oriented, needle-shaped crystals in a light-transmitting medium positioned to intercept both of said components, the direction of orientation of the needle axes of the particles in said second suspension being substantially at right angles to the direction of orientation of the needle axes of the particles in said first-mentioned suspension, the suspending medium and the oriented particles of said second suspension having indices of refraction such that said second suspension transmits said specular component without substantial change, and diffuses said diffused component in directions substantially at right angles to the directions of diffusion thereof.

EDWIN H. LAND.